United States Patent
Kuroyanagi et al.

(10) Patent No.: US 8,228,440 B2
(45) Date of Patent: *Jul. 24, 2012

(54) RECEIVER

(75) Inventors: Tatsuo Kuroyanagi, Daito (JP);
Yoshiaki Fukuno, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1176 days.

This patent is subject to a terminal disclaimer.

(21) Appl. No.: 12/042,781

(22) Filed: Mar. 5, 2008

(65) Prior Publication Data

US 2008/0218639 A1   Sep. 11, 2008

(30) Foreign Application Priority Data

Mar. 6, 2007 (JP) ................................ 2007-055073

(51) Int. Cl.
 *H04N 5/63* (2006.01)
(52) U.S. Cl. .......................................................... 348/730
(58) Field of Classification Search .................. 348/730
 See application file for complete search history.

(56) References Cited

U.S. PATENT DOCUMENTS

| 5,332,977 | A |   | 7/1994  | Fritsche et al. |         |
|-----------|---|---|---------|-----------------|---------|
| 6,650,376 | B1| * | 11/2003 | Obitsu          | 348/730 |
| 7,454,180 | B2|   | 11/2008 | Ohtaki et al.   |         |
| 7,561,213 | B2|   | 7/2009  | Okamoto         |         |
| 2006/0010473 | A1 |   | 1/2006 | Takagi et al. |         |
| 2006/0010474 | A1 |   | 1/2006 | Tsukamoto     |         |
| 2007/0130609 | A1 | * | 6/2007 | Han et al.    | 725/132 |

FOREIGN PATENT DOCUMENTS

| JP | 5-268608 A    | 10/1993 |
| JP | 6-6248 A      | 1/1994  |
| JP | 2002-122651 A | 4/2002  |
| JP | 2005-151070 A | 6/2005  |
| JP | 2006-13973 A  | 1/2006  |
| JP | 2006-25199 A  | 1/2006  |
| JP | 2006-157338 A | 6/2006  |
| JP | 2006-332770 A | 12/2006 |

OTHER PUBLICATIONS

Japanese Office Action dated Oct. 19, 2010 with English translation (six (6) pages).
Japanese Office Action dated Jul. 27, 2010 including English translation (Six (6) pages).

* cited by examiner

*Primary Examiner* — Dominic D Saltarelli
(74) *Attorney, Agent, or Firm* — Crowell & Moring LLP (57) ABSTRACT

This receiver includes a control portion detecting whether or not an antenna is connected and whether or not the connected antenna is an active antenna and a power supply portion supplying power to the antenna, while the control portion controls the power supply portion to supply power to the antenna when detecting that the connected antenna is an active antenna and controls the power supply portion not to supply power to the antenna when at least detecting that the antenna is not connected.

15 Claims, 8 Drawing Sheets

RECEIVER

BACKGROUND OF THE INVENTION

1. Field of the Invention

The present invention relates to a receiver, and more particularly, it relates to a receiver comprising a receiver body connected with an antenna.

2. Description of the Background Art

A receiver comprising a receiver body connected with an antenna is known in general, as disclosed in each of Japanese Patent laying-Open Nos. 2002-122651, 2006-25199 and 2006-13973, for example.

The aforementioned Japanese Patent Laying-Open No. 2002-122651 discloses a GPS receiver comprising a receiver body including an antenna connection state detecting portion. In this GPS receiver described in Japanese Patent Laying-Open No. 2002-122651, the antenna connection state detecting portion detects a voltage between the receiver body and the antenna, and determines whether the antenna connected to the receiver body is an active antenna or a passive antenna through the level of the voltage. Thus, the GPS receiver can operate correspondingly to the determined antenna.

The aforementioned Japanese Patent Laying-Open No. 2006-25199 discloses a television broadcasting receiver comprising a receiver body including antenna identification means. In this television broadcasting receiver described in Japanese Patent Laying-Open No. 2006-25199, the antenna identification means determines whether an antenna connected to the receiver body is a unidirectional antenna or a multidirectional antenna. The unidirectional antenna can receive signals only in a single direction, while the multidirectional antenna can receive signals in a plurality of directions.

The aforementioned Japanese Patent Laying-Open No. 2006-13973 discloses a digital television broadcasting signal receiver. This digital television broadcasting signal receiver described in Japanese Patent Laying-Open No. 2006-13973 is so formed as to determine whether an antenna connected to the body thereof is a unidirectional antenna or a multidirectional antenna through the difference in receiving strength between a signal, included in signals received by the antenna, in a direction maximizing the receiving strength and another signal in a direction opposite to the direction maximizing the receiving strength.

However, the aforementioned Japanese Patent Laying-Open No. 2002-122651 describing the GPS receiver neither discloses nor suggests a function of determining whether or not the antenna is connected to the receiver body. Even when no antenna is connected to the receiver body, therefore, power may conceivably be supplied to an antenna connection portion of the receiver body. Thus, power consumption is disadvantageously increased.

Each of the aforementioned Japanese Patent Laying-Open Nos. 2006-25199 and 2006-13973 describing the television broadcasting receiver and the digital television broadcasting signal receiver respectively neither discloses nor suggests a function of determining whether or not the antenna connected to the receiver body is an active antenna. Thus, it may be impossible to determine whether or not the antenna connected to the receiver body is an active antenna.

SUMMARY OF THE INVENTION

The present invention has been proposed in order to solve the aforementioned problems, and an object of the present invention is to provide a receiver capable of determining whether or not an antenna connected to a receiver body is an active antenna and capable of suppressing increase in power consumption.

A receiver according to a first aspect of the present invention comprises a receiver body including an antenna connection portion connected with an antenna, a control portion having an antenna detecting function of detecting whether or not the antenna is connected to the receiver body and whether or not the antenna connected to the receiver body is an active antenna and a power supply portion supplying power to the antenna, while the control portion is so formed as to control the power supply portion to supply power to the antenna through the antenna connection portion when detecting that the antenna connected to the receiver body is the active antenna through the antenna detecting function and to control the power supply portion not to supply power to the antenna connection portion when at least detecting that the antenna is not connected to the receiver body.

As hereinabove described, the receiver according to the first aspect of the present invention comprises the control portion having the antenna detecting function of detecting whether or not the antenna is connected to the receiver body and whether or not the antenna connected to the receiver body is the active antenna, thereby automatically detecting that the antenna connected to the receiver body is the active antenna through the antenna detecting function of the control portion. Further, the control portion controls the power supply portion not to supply power to the antenna connection portion when detecting that the antenna is not connected to the receiver body, whereby increase in power consumption can be suppressed.

In the aforementioned receiver according to the first aspect, the control portion is preferably so formed as to control the power supply portion not to supply power to the antenna connection portion also when detecting that the antenna connected to the receiver body is not the active antenna in addition to the case of detecting that the antenna is not connected to the receiver body through the antenna detecting function. According to this structure, the control portion controls the power supply portion not to supply power to the antenna connection portion also when an antenna other than the active antenna is connected to the receiver body, whereby increase in power consumption can be further suppressed.

In the aforementioned receiver according to the first aspect, the control portion preferably detects whether or not the antenna is the active antenna through the antenna detecting function every time power is supplied to the receiver body. According to this structure, the control portion can easily detect whether or not the antenna connected to the receiver body is the active antenna through the antenna detecting function when power is subsequently supplied to the receiver body, even if the user exchanges the antenna when no power is supplied to the receiver body.

In the aforementioned receiver according to the first aspect, the receiver body preferably includes a display portion displaying television image information received by the antenna, and the display portion is enabled to display a set screen portion prompting the user to set whether or not to supply power to the antenna. According to this structure, the user can set whether or not to supply power to the antenna through the set screen portion of the display portion, thereby easily setting whether or not to supply power to the antenna.

In the aforementioned receiver according to the first aspect, the control portion preferably controls the power supply portion not to supply power to the antenna when the display portion displays an image other than a television image. According to this structure, the control portion controls the power supply portion not to supply power to the active antenna when the display portion displays an image of a DVD or the like, for example, whereby increase in power consumption can be further suppressed.

The aforementioned receiver according to the first aspect preferably further comprises a resistance portion provided between the power supply portion and the antenna connection portion, and the control portion is preferably so formed as to detect whether or not the antenna is the active antenna by supplying power of a prescribed level from the power supply portion to the antenna through the antenna connection portion and detecting the level of a voltage between the resistance portion and the antenna connection portion through the antenna detecting function. According to this structure, the control portion detects whether or not the antenna connected to the antenna connection portion is the active antenna through the level of the voltage detected through the antenna detecting function, thereby easily detecting whether or not the antenna connected to the antenna connection portion is the active antenna.

In the aforementioned receiver according to the first aspect, the control portion preferably has a receiving sensitivity detecting function of detecting change in receiving strength of a signal received from the antenna thereby detecting whether or not the antenna connected to the receiver body is the active antenna when changing the level of power supplied from the power supply portion to the antenna. According to this structure, the control portion detects change in the receiving strength of the received signal resulting from change in the level of the power supplied to the antenna, thereby easily detecting whether or not the antenna connected to the antenna connection portion is the active antenna.

In the aforementioned receiver according to the first aspect, the receiver body preferably further includes a switching portion on-off controlled by the control portion for controlling power supply from the power supply portion to the antenna. According to this structure, the switching portion can easily switch power supply from the power supply portion to the antenna and stop of the power supply from the power supply portion to the antenna.

In the aforementioned receiver having the control portion detecting whether or not the antenna is the active antenna by detecting the level of the voltage between the resistance portion and the antenna connection portion, the control portion preferably determines that the antenna connected to the receiver body is the active antenna and controls the power supply portion to supply power to the antenna when determining that the voltage between the resistance portion and the antenna connection portion is a first voltage. According to this structure, the control portion can easily determine whether or not the active antenna is connected to the receiver body, and can control the power supply portion to supply power to the antenna.

In the aforementioned receiver having the control portion detecting whether or not the antenna is the active antenna by detecting the level of the voltage between the resistance portion and the antenna connection portion, the control portion preferably determines that the antenna connected to the receiver body is a passive antenna and controls the power supply portion not to supply power to the antenna when determining that the voltage between the resistance portion and the antenna connection portion is the ground potential. According to this structure, the control portion can easily determine whether or not the passive antenna is connected to the receiver body, and can control the power supply portion not to supply power to the antenna.

In the aforementioned receiver having the control portion detecting whether or not the antenna is the active antenna by detecting the level of the voltage between the resistance portion and the antenna connection portion, the control portion preferably determines that the antenna is not connected to the receiver body and controls the power supply portion not to supply power to the antenna when determining that the voltage between the resistance portion and the antenna connection portion is a second voltage. According to this structure, the control portion can easily determine whether or not the antenna is connected to the receiver body, and can control the power supply portion not to supply power to the antenna.

In the aforementioned receiver having the control portion detecting whether or not the antenna is the active antenna every time power is supplied to the receiver body, the control portion preferably controls the power supply portion to supply prescribed power to the antenna through the antenna connection portion in order to detect whether or not the antenna is the active antenna every time power is supplied to the receiver body. According to this structure, the control portion can easily detect whether or not the antenna connected to the receiver body is the active antenna every time power is supplied to the receiver body.

In the aforementioned receiver having the control portion controlling the power supply portion not to supply power to the antenna when the display portion displays an image other than the television image, the control portion is preferably so formed as to control the power supply portion to stop supplying power to the antenna connection portion when the display portion is so set as to display the image other than the television image while the power supply portion supplies power to the antenna connection portion. According to this structure, the control portion controls the power supply portion not to supply power to the active antenna when the display portion displays an image of a DVD or the like, for example, after the same is so set as to display the television image, whereby increase in power consumption can be further suppressed.

In the aforementioned receiver having the control portion determining whether or not the antenna is the active antenna by detecting change in the receiving strength of the signal received from the antenna, the control portion preferably determines that the antenna connected to the receiver body is the active antenna and controls the power supply portion to supply power to the antenna if determining that the receiving strength of the signal received from the antenna is changed when changing the level of power supplied from the power supply portion to the antenna. According to this structure, the control portion determines that the antenna connected to the antenna connection portion is the active antenna when detecting change in the receiving strength of the received signal resulting from change in the level of the power supplied to the antenna, thereby easily detecting whether or not the antenna connected to the antenna connection portion is the active antenna.

A television set according to a second aspect of the present invention comprises a receiver including an antenna connection portion connected with an antenna, a control portion having an antenna detecting function of detecting whether or not the antenna is connected to the receiver and whether or not the antenna connected to the receiver is an active antenna and a power supply portion supplying power to the antenna and a display portion displaying an image received by the receiver, while the control portion is so formed as to control the power supply portion to supply power to the antenna through the antenna connection portion when detecting that the antenna connected to the receiver is the active antenna through the antenna detecting function and to control the power supply portion not to supply power to the antenna connection portion when at least detecting that the antenna is not connected to the receiver.

In the television set according to the second aspect of the present invention, as hereinabove described, the receiver includes the control portion having the antenna detecting function of detecting whether or not the antenna is connected to the receiver and whether or not the antenna connected to the receiver is the active antenna, thereby automatically detecting that the antenna connected to the receiver is the active antenna through the antenna detecting function of the control portion. Further, the control portion controls the power supply portion not to supply power to the antenna connection portion when detecting that the antenna is not connected to the receiver, whereby increase in power consumption can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

First, the structure of a receiver 2 according to a first embodiment of the present invention is described with reference to FIGS. 1 to 3. According to the first embodiment, the present invention is applied to the receiver 2 of a digital television 1 employed as an exemplary television set.

Figure 1:
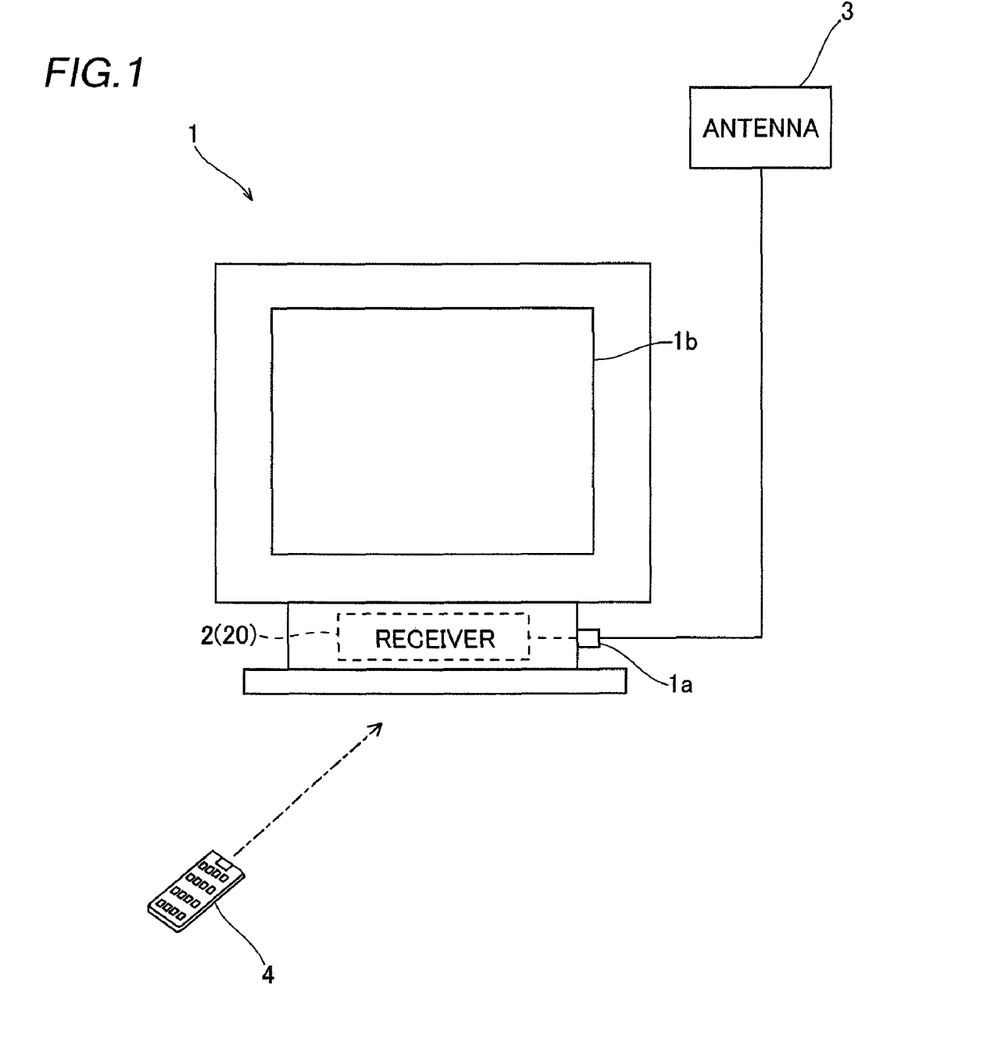
FIG. 1 illustrates the overall structure of a digital television storing a receiver according to a first embodiment of the present invention.

The receiver 2 of the digital television 1 according to the first embodiment is stored in the digital television 1, as shown in FIG. 1. The digital television 1 is constituted of an antenna connection portion 1a connected with an antenna 3, a display portion 1b displaying information such as an image received by the antenna 3 and the receiver 2 converting a signal received by the antenna 3 to an image. The digital television 1 can be operated through a remote control 4.

Figure 2:
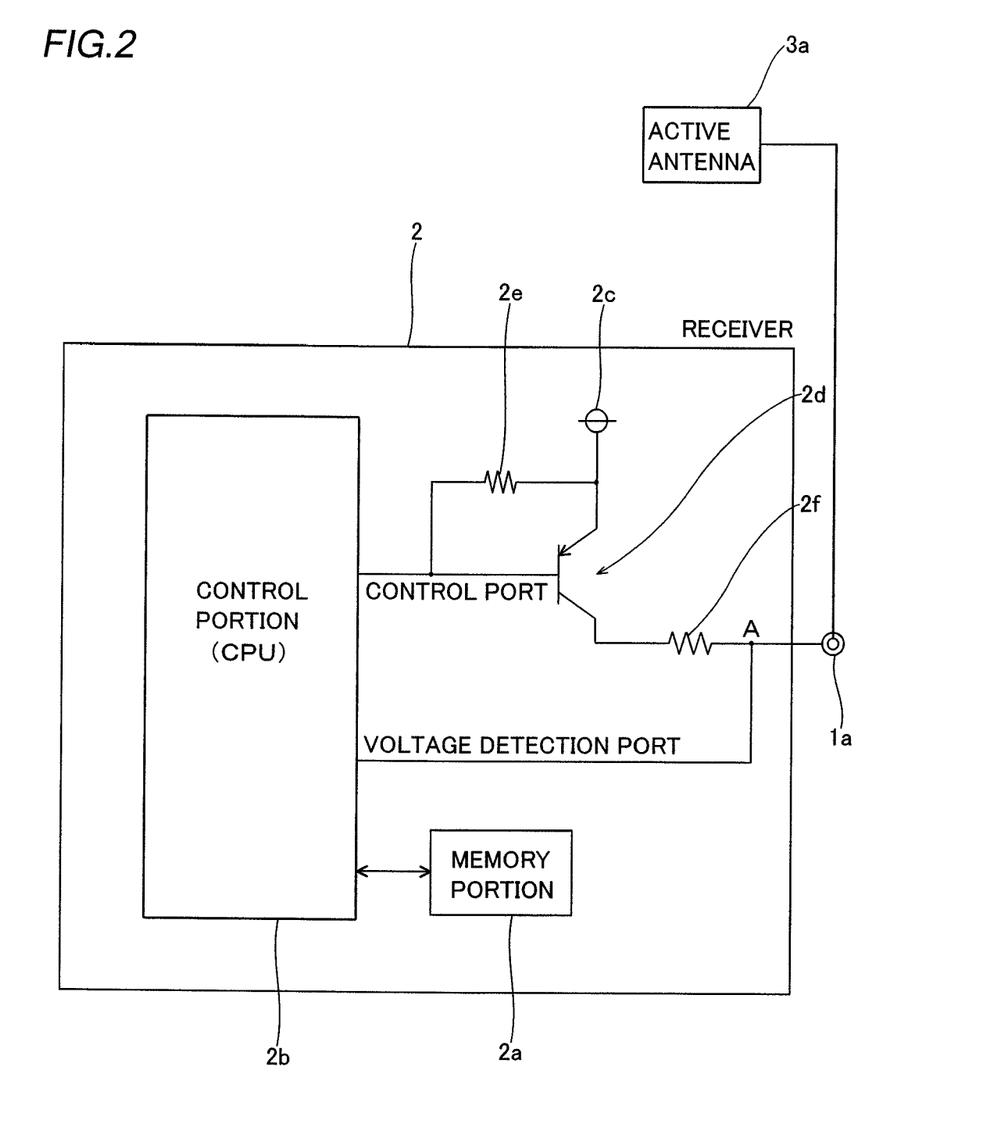
FIGS. 2 and 3 are block diagrams of the receiver according to the first embodiment of the present invention shown in FIG. 1.
Figure 3:
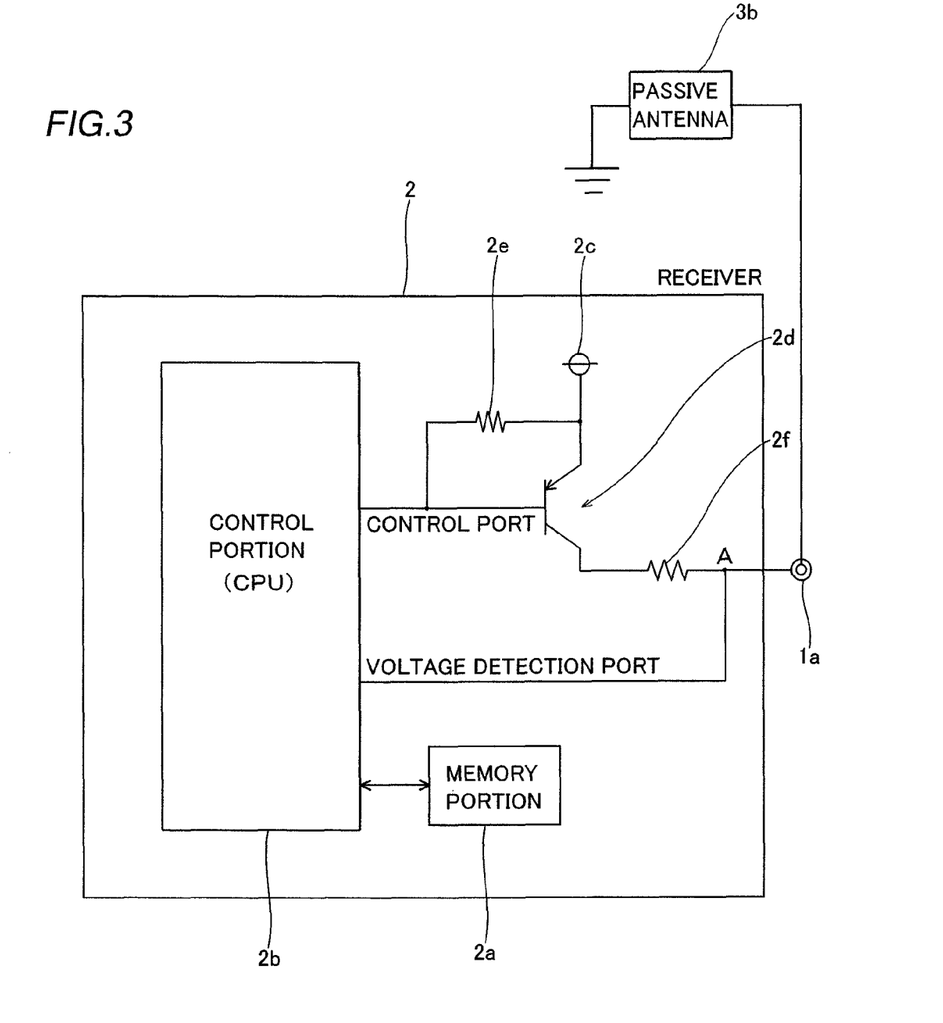

As shown in FIGS. 2 and 3, the receiver 2 according to the first embodiment is constituted of a memory portion 2a, a control portion 2b formed by a CPU, a power supply portion 2c supplying power to the control portion 2b and the antenna 3 (see FIG. 1), a switching transistor 2d formed by a bipolar transistor (PNP transistor), a resistance 2e and a voltage detecting resistance 2e. FIG. 2 shows a state where an active antenna 3a is connected to the receiver 2 according to the first embodiment, and FIG. 3 shows a state where a passive antenna 3b is connected to the receiver 2 according to the first embodiment. The active antenna 3a includes an amplification circuit electrically amplifying and attenuating a received signal. The passive antenna 3b includes no amplification circuit electrically amplifying and attenuating a received signal. The switching transistor 2d is an example of the "switching portion" in the present invention.

The memory portion 2a stores a control program for controlling the receiver 2 and the like.

According to the first embodiment, the control portion 2b is so formed as to control the power supply portion 2c to supply power to the antenna 3 through the antenna connection portion 1a when detecting that the antenna 3 (see FIG. 1) connected to the digital television 1 is the active antenna 3a (see FIG. 2) and to control the power supply portion 2c not to supply power to the antenna connection portion 1a when detecting that the antenna 3 is not the active antenna 3a, as shown in FIGS. 2 and 3. Further, the control portion 2b is so formed as to control the power supply portion 2c not to supply power to the antenna connection portion 1a also when detecting that the antenna 3 is not connected to the digital television 1.

According to the first embodiment, the control portion 2b is so formed as to control the power supply portion 2c not to supply power to the antenna connection portion 1a when the display portion 1b of the digital television 1 displays an image, such as an image of a DVD, for example, other than a television image. Further, the control portion 2b is so formed as to control the power supply portion 2c to stop supplying power to the antenna connection portion 1a when the display portion 1b is so set as to display an image other than the television image while the power supply portion 2c supplies power to the antenna connection portion 1a.

As shown in FIGS. 2 and 3, the power supply portion 2c is so formed as to supply power to the control portion 2b through the resistance 2c and to supply power to the antenna 3 (see FIG. 1) through the switching transistor 2d, the voltage detecting resistance 2f and the antenna connection portion 1a. The switching transistor 2d is arranged between the power supply portion 2c and the voltage detecting resistance 2f, and on-off controlled on the basis of a control signal transmitted from a control port of the control portion 2b to the base of the switching transistor 2d. The resistance 2e is provided in order to control power supplied from the power supply portion 2c to the control portion 2b. A portion (node A in FIG. 2) between the voltage detecting resistance 2f and the antenna connection portion 1a is connected to a voltage detecting port of the control portion 2b. The voltage detecting resistance 2f is provided in order to control power supplied to the antenna 3 and to detect a voltage of the control portion 2b at the node A.

According to the first embodiment, the control portion 2b is so formed as to supply power of a prescribed level from the power supply portion 2c to the antenna 3 (see FIG. 1) through the antenna connection portion 1a and to detect whether or not the antenna 3 is the active antenna 3a by detecting the level of the voltage at the node A between the voltage detecting resistance 2f and the antenna connection portion 1a, as shown in FIGS. 2 and 3.

More specifically, the power supply portion 2c supplies power consisting of a voltage of about 5 V and a current of about 30 mA. The supplied power reaches the antenna 3 through the switching transistor 2d, the voltage detecting resistance 2f, the node A and the antenna connection portion 1a. At this time, the control portion 2b detects the level of the voltage at the node A and determines whether or not the connected antenna 3 is the active antenna 3a. The amplification circuit included in the active antenna 3a as described above can be regarded as a constant load. When the active antenna 3a is connected to the antenna connection portion 1a, therefore, the control portion 2b detects a voltage of about 1 V at the node A. On the other hand, the passive antenna 3b (see FIG. 3) includes no amplification circuit as described above, and one side thereof is grounded. When the passive antenna 3b is connected to the antenna connection portion 1a, therefore, the control portion 2b detects a voltage of about 0 V at the node A. When the antenna 3 (the active antenna 3a or the passive antenna 3b) is not connected to the antenna connection portion 1a, it follows that the antenna connection portion 1a is open, whereby no power is supplied to the antenna connection portion 1a, and no current flows to the voltage detecting resistance 2f. Therefore, the control portion 2b detects a voltage of about 5 V at the node A. Thus, the control portion 2b determines that the antenna 3 connected to the antenna connection portion 1a is the active antenna 3a when the voltage at the node A is about 1 V, and determines that the antenna 3 connected to the antenna connection portion 1a is the passive antenna 3b when the voltage at the node A is about 0 V. When the voltage at the node A is about 5 V, the control portion 2b determines that the antenna 3 (the active antenna 3a or the passive antenna 3b) is not connected to the antenna connection portion 1a.

Operations of the receiver 2 according to the first embodiment upon power supply and in a power supply state are now described with reference to FIGS. 1 to 7.

Figure 4:
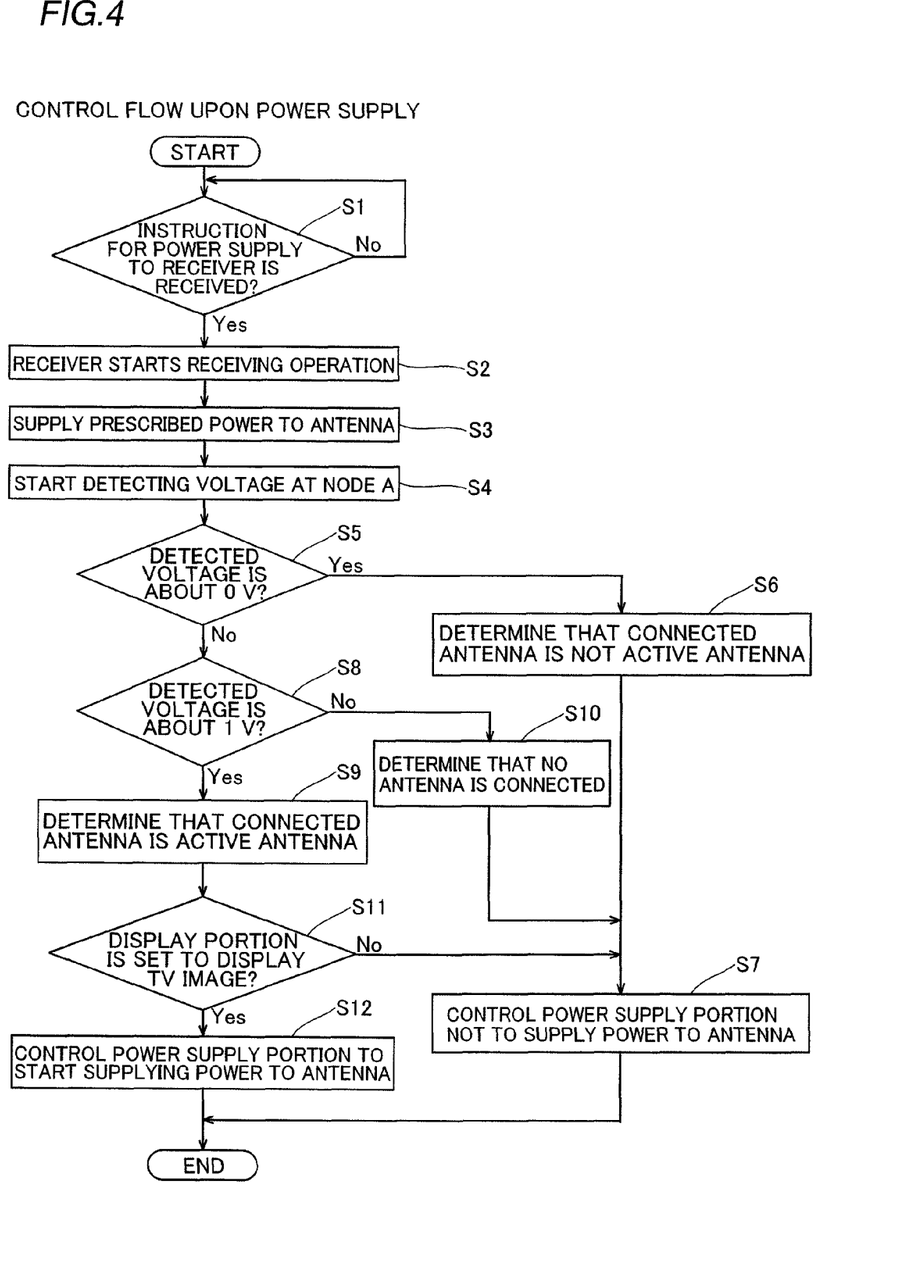
FIG. 4 is a flow chart showing a control flow upon power supply to the receiver according to the first embodiment of the present invention shown in FIG. 1.

First, the operation upon power supply to the receiver 2 according to the first embodiment of the present invention is described. As shown in FIG. 4, the receiver 2 (see FIG. 2) determines whether or not an instruction for power supply thereto is received from the user through the remote control 4 or the like at a step S1, and repeats this determination until power is supplied to the receiver 2. When determining that the instruction for power supply is received, the receiver 2 starts a receiving operation at a step S2. The power supply portion 2c supplies the power consisting of the voltage of about 5 V and the current of about 30 mA to the antenna connection portion 1a (see FIG. 2) at a step S3, and the control portion 2b starts detecting the voltage at the node A at a step S4. When determining that the voltage detected at the step S4 is about 0 V at a step S5, the control portion 2b determines that the antenna 3 connected to the antenna connection portion 1a is not the active antenna 3a at a step S6, and advances to a step S7. At the step S7, the control portion 2b controls the power supply portion 2c not to supply power to the antenna 3, and terminates the processing. In this case, the antenna 3 connected to the antenna connection portion 1a is conceivably the passive antenna 3b (see FIG. 3), since the detected voltage is about 0 V.

When determining that the detected voltage is not about 0 V at the step S5, on the other hand, the control portion 2b determines whether or not the detected voltage is about 1 V at a step S8, as shown in FIG. 4. When determining that the detected voltage is about 1 V at the step S8, the control portion 2b determines that the connected antenna 3 is the active antenna 3a at a step S9.

When determining that the detected voltage is not about 1 V at the step S8, on the other hand, the control portion 2b determines that the antenna 3 is not connected to the antenna connection portion 1a (see FIG. 2) at a step S10. Then, the control portion 2b controls the power supply portion 2c not to supply power to the antenna 3 at the step S7, and terminates the processing. In this case, the control portion 2b detects a voltage of about 5 V. In other words, the antenna connection portion 1a is conceivably not connected with the antenna 3 but open.

When determining that the connected antenna 3 is the active antenna 3a at the step S9, the control portion 2b advances to a step S11, and determines whether or not the display portion 1b is set to display a television image. In other words, the control portion 2b determines whether or not to display image information received through the antenna 3 on the display portion 1b (see FIG. 1) of the digital television 1. More specifically, the user conceivably watches the television image when the display portion 1b is set to display the television image. When the display portion 1b is not set to display the television image, on the other hand, the display portion 1b conceivably displays image information of an external device such as a DVD player, for example.

When determining that the display portion 1b of the digital television 1 is set to display the television image at the step S11 shown in FIG. 4, the control portion 2b controls the power supply portion 2c to start supplying power to the antenna 3 at a step S12, and terminates the processing. When determining that the display portion 1b is not set to display the television image, on the other hand, the control portion 2b controls the power supply portion 2c not to supply power to the antenna 3 at the step S7, and terminates the processing.

According to the first embodiment, the control portion 2b detects whether or not the antenna 3 connected to the antenna connection portion 1a is the active antenna 3 every time power is supplied to the digital television 1.

Figure 5:
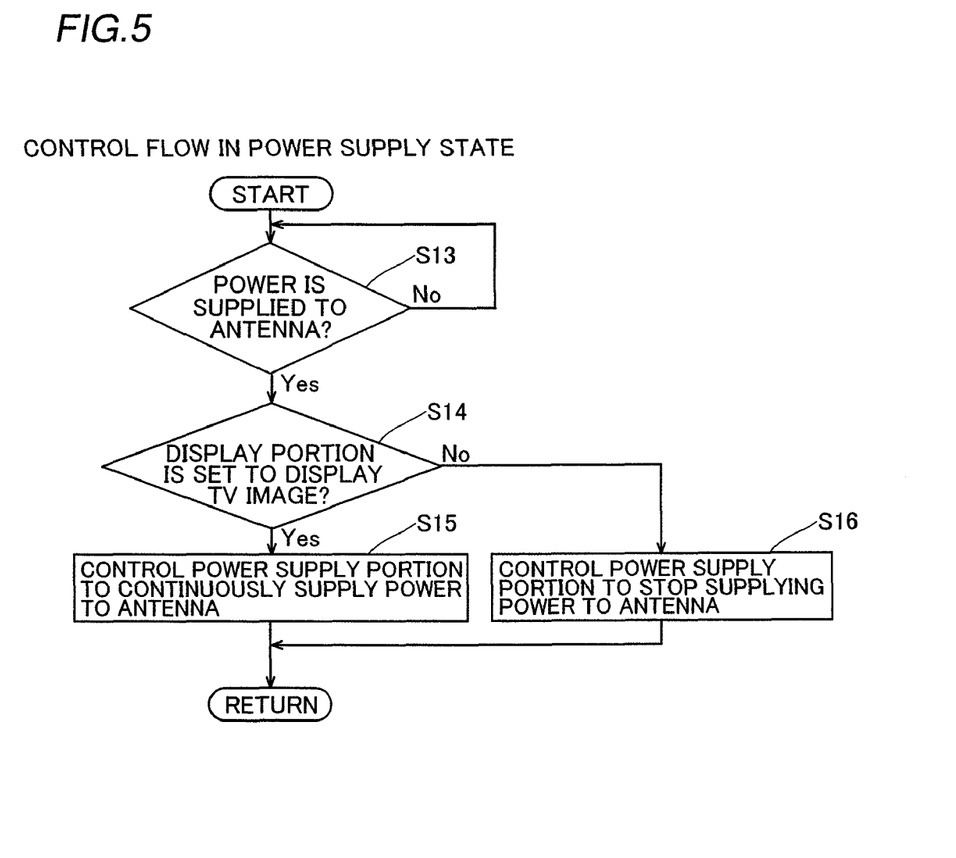
FIG. 5 is a flow chart showing a control flow in a power supply state of the receiver according to the first embodiment of the present invention shown in FIG. 1.

The operation in the power supply state of the receiver 2 according to the first embodiment of the present invention is now described. As shown in FIG. 5, the control portion 2b determines whether or not power is supplied to the antenna 3 (see FIG. 1) at a step S13. When not determining that power is supplied to the antenna 3, the control portion 2 repeats this determination until the same determines that power is supplied. When determining that power is supplied to the antenna 3, the control portion 2b determines whether or not the display portion 1b is set to display the television image at a step S14. When determining that the display portion 1b is set to display the television image, the control portion 2b advances to a step S15, controls the power supply portion 1c to continuously supply power to the antenna 3, and returns to the initial step for repeating the operation. When determining that the display portion 1b is not set to display the television image at the step S14, on the other hand, the control portion 2b advances to a step S16, and controls the power supply portion 2c to stop supplying power to the antenna 3. When the display portion 1b is not set to display the television image in the power supply state of the receiver 2, it is conceivable that the user switches the display portion 1b to display image information of the external device such as a DVD player in an intermediate stage of watching the television image.

Figure 6:
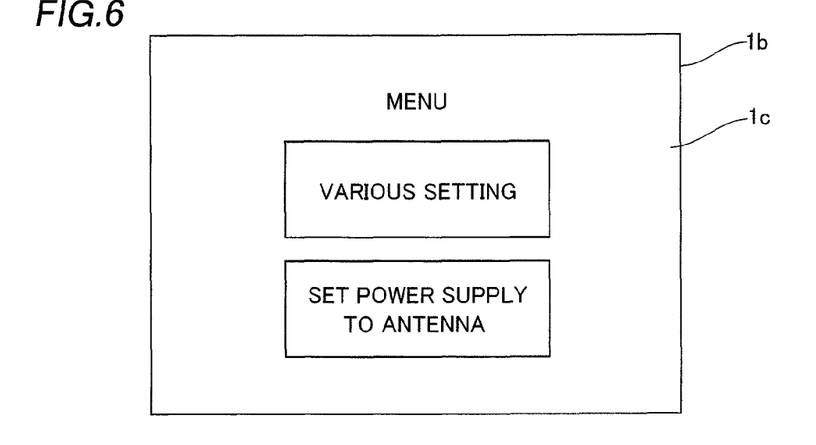
FIGS. 6 and 7 illustrate set screens displayed on a display portion of the digital television shown in FIG. 1.
Figure 7:
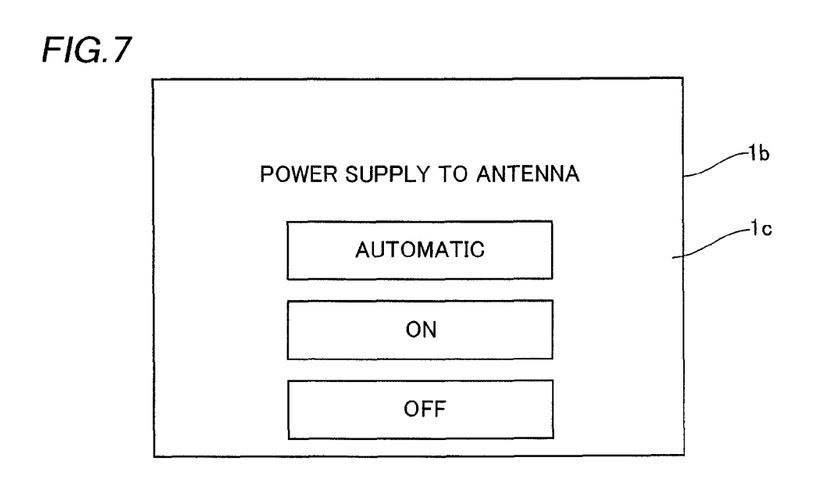

According to the first embodiment, the display portion 1b (see FIG. 1) of the digital television 1 can display a set screen 1c enabling the user to manually set whether or not to supply power to the antenna 3, as shown in FIGS. 6 and 7. More specifically, the user operates the remote control 4 (see FIG. 1) so that the display portion 1b of the digital television 1 displays a menu screen shown in FIG. 6. Then, the user selects the item of "set power supply to antenna", so that the display portion 1b displays a screen for supplying (ON) or not supplying (OFF) power to the antenna 3 or automatically selecting whether or not to supply power to the antenna 3, as shown in FIG. 7. On this screen, the user can forcibly set whether or not to supply power to the antenna 3 by operating the remote control 4 (see FIG. 1), or can set the control portion 2b to automatically determine whether or not the antenna 3 is connected and whether or not the active antenna 3a is connected, and to select whether or not to automatically supply power to the antenna 3.

According to the first embodiment, as hereinabove described, the receiver 2 comprises the control portion 2b detecting whether or not the antenna 3 is connected to the digital television 1 and whether or not the antenna 3 connected to the digital television 1 is the active antenna 3, whereby the control portion 2b can automatically detect that the antenna 3 connected to the digital television 1 is the active antenna 3a. When detecting that the antenna 3 is not connected to the digital television 1, on the other hand, the control portion 2b controls the power supply portion 2c not to supply power to the antenna connection portion 1a, whereby increase in power consumption can be suppressed.

According to the first embodiment, the control portion 2b is so formed as to control the power supply portion 1c not to supply power to the antenna connection portion 1a also when detecting that the antenna 3 is not the active antenna 3a in addition to the case of detecting that the antenna 3 is not connected to the digital television 1 for controlling the power supply portion 1c not to supply power to the antenna connection portion 1a also when an antenna other than the active antenna 3a is connected, whereby increase in power consumption can be further suppressed.

According to the first embodiment, the control portion 2b is so formed as to detect whether or not the antenna 3 is the active antenna 3a every time power is supplied to the digital television 1, whereby the control portion 2b can easily detect whether or not the connected antenna 3 is the active antenna 3a when power is subsequently supplied to the digital television 1 even if the user exchanges the antenna 3 when no power is supplied to the digital television 1.

According to the first embodiment, the receiver 2 further comprises the voltage detecting resistance 2f provided between the power supply portion 2c and the antenna connection portion 1a and the control portion 2b is so formed as to detect whether or not the antenna 3 is the active antenna 3a by controlling the power supply portion 2c to supply the power consisting of the voltage of about 5 V and the current of about 30 mA to the antenna 3 through the antenna connection portion 1a and detecting the level of the voltage between the voltage detecting resistance 2f and the antenna connection portion 1a, whereby the control portion 2b can easily detect whether or not the antenna 3 connected to the antenna connection portion 1a is the active antenna 3a.

According to the first embodiment, the control portion 2b is so formed as to control the power supply portion 2c not to supply power to the antenna 3 when the display portion 1b displays an image other than the television image for controlling the power supply portion 2c not to supply power to the active antenna 3a when the display portion 1b displays an image of a DVD or the like, for example, and the active antenna 3a is not used, whereby increase in power consumption can be further suppressed.

According to the first embodiment, the digital television 1 includes the display portion 1b displaying the television image information received by the antenna 3 and the display portion 1b is enabled to display the set screen 1c prompting the user to set whether or not to supply power to the antenna 3, whereby the user can set whether or not to supply power to the antenna 3 through the set screen 1c of the display portion 1b, thereby easily setting whether or not to supply power to the antenna 3.

According to the first embodiment, as hereinabove described, the receiver 2 is provided with the switching transistor 2d on-off controlled by the control portion 2b for controlling power supply from the power supply portion 2c to the antenna 3, whereby the switching transistor 2d can easily switch power supply from the power supply portion 2c to the antenna 3 and stop of the power supply from the power supply portion 2c to the antenna 3.

According to the first embodiment, as hereinabove described, the control portion 2b is so formed as to determine that the antenna 3 connected to the digital television 1 is the active antenna 3a and to control the power supply portion 2c to supply power to the antenna 3 when determining that the voltage between the voltage detecting resistance 2f and the antenna connection portion 1a is about 1 V, whereby the control portion 2b can easily determine whether or not the active antenna 3a is connected to the digital television 1, and can control the power supply portion 2c to supply power to the antenna 3.

According to the first embodiment, as hereinabove described, the control portion 2b is so formed as to determine that the antenna 3 connected to the digital television 1 is the passive antenna 3b and to control the power supply portion 2c not to supply power to the antenna 3 when determining that the voltage between the voltage detecting resistance 2f and the antenna connection portion 1a is about 0 V corresponding to the ground potential, whereby the control portion 2b can easily determine whether or not the passive antenna 3b is connected to the television 1, and can control the power supply portion 2c not to supply power to the antenna 3.

According to the first embodiment, as hereinabove described, the control portion 2b is so formed as to determine that the antenna 3 is not connected to the digital television 1 and to control the power supply portion 2c not to supply power to the antenna 3 when determining that the voltage between the voltage detecting resistance 2f and the antenna connection portion 1a is about 5 V, whereby the control portion 2b can easily determine whether or not the antenna 3 is connected to the digital television 1, and can control the power supply portion 2c not to supply power to the antenna 3.

According to the first embodiment, as hereinabove described, the control portion 2b is so formed as to control the power supply portion 2c to supply prescribed power to the antenna 3 through the antenna connection portion 1a in order to detect whether or not the antenna 3 is the active antenna 3a every time power is supplied to the digital television 1, thereby easily detecting whether or not the antenna 3 connected to the digital television 1 is the active antenna 3a every time power is supplied to the digital television 1.

According to the first embodiment, as hereinabove described, the control portion 2b is so formed as to control the power supply portion 2c to stop supplying power to the antenna connection portion 1a when the display portion 1b is set to display an image other than the television image while the power supply portion 2c supplies power to the antenna connection portion 1a so that the control portion 2b controls the power supply portion 2c not to supply power to the active antenna 3a when the user first sets the display portion 1b to display the television image and thereafter changes the setting to not use the active antenna 3a so that the display portion 1b displays an image of a DVD or the like, for example, whereby increase in power consumption can be further suppressed.

(Second Embodiment)

In a receiver 20 according to a second embodiment of the present invention, a control portion 20b detects whether or not an antenna 3 connected to an antenna connection portion 1a is an active antenna 3a by detecting change in receiving strength in the antenna 3, dissimilarly to the control portion 2*b* of the receiver 2 according to the first embodiment detecting whether or not the antenna 3 connected to the digital television 1 is the active antenna 3*a* through the level of the detected voltage. As to portions of the receiver 20 according to the second embodiment similar to those of the receiver 2 according to the first embodiment, redundant description is not repeated.

Figure 8:
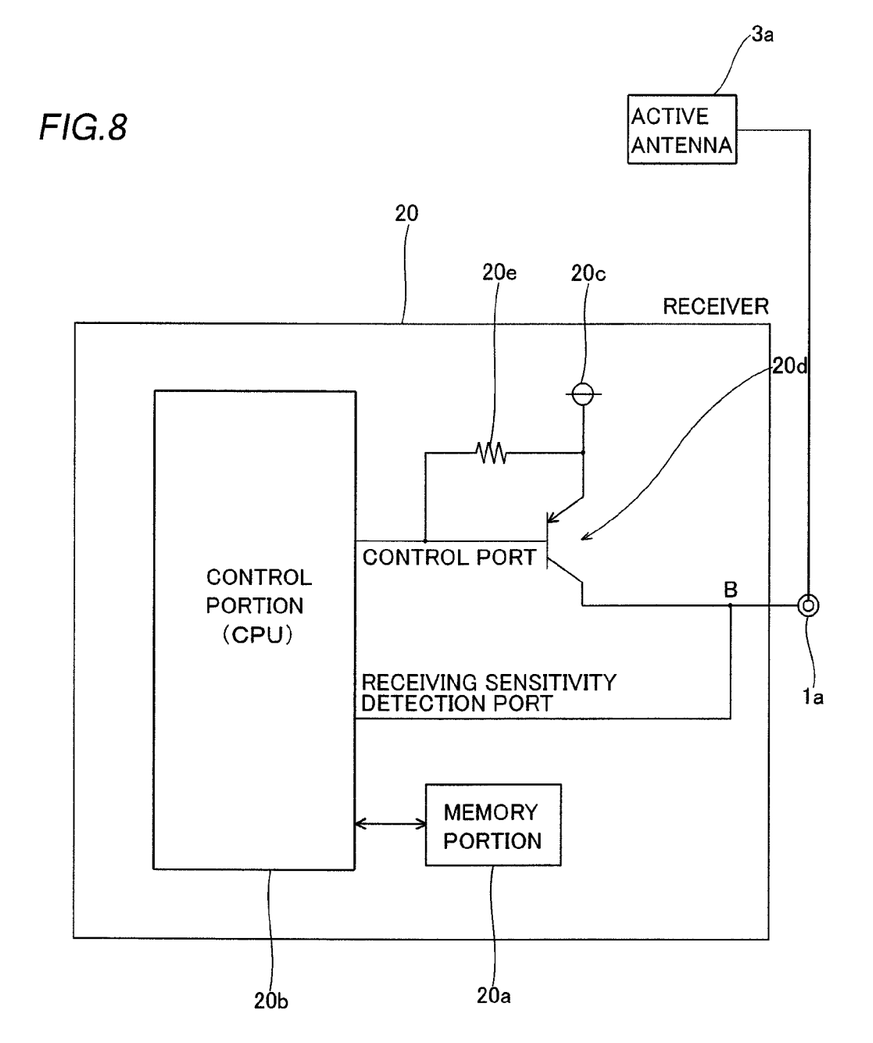
FIG. 8 is a block diagram of a receiver according to a second embodiment of the present invention.

First, the structure of the receiver 20 according to the second embodiment of the present invention is described with reference to FIGS. 1 and 8. As shown in FIG. 8, the receiver 20 of a digital television 1 according to the second embodiment of the present invention has a structure obtained by removing the voltage detecting resistance 2*f* from the receiver 2 (see FIG. 2) according to the first embodiment, and is so formed that power supplied by a power supply portion 20*c* reaches the antenna 3 (see FIG. 1) through a switching transistor 20*d* and the antenna connection portion 1*a*.

According to the second embodiment, a memory portion 20*a* stores a control program for controlling the receiver 20 and the like. The control portion 20*b* is so formed as to detect whether or not the active antenna 3*a* is connected by detecting change in receiving strength of a signal received from the antenna 3 at a node B when changing the level of the power supplied from the power supply portion 20*c* to the antenna 3 (see FIG. 1). More specifically, the receiving strength of the received signal detected at the node B is changed when the level of the power supplied to the antenna 3 transmitting the signal to the receiver 20 is changed, if the antenna 3 connected to the antenna connection portion 1*a* is the active antenna 3*a*. If the connected antenna 3 is a passive antenna 3*b* or the antenna 3 is not connected, on the other hand, the receiving strength of the received signal remains unchanged. In other words, the control portion 20*b* is so formed as to detect that the antenna 3 connected to the antenna connection portion 1*a* is the active antenna 3*a* if the receiving strength of the received signal is changed when changing the level of the power supplied to the antenna 3.

Figure 9:
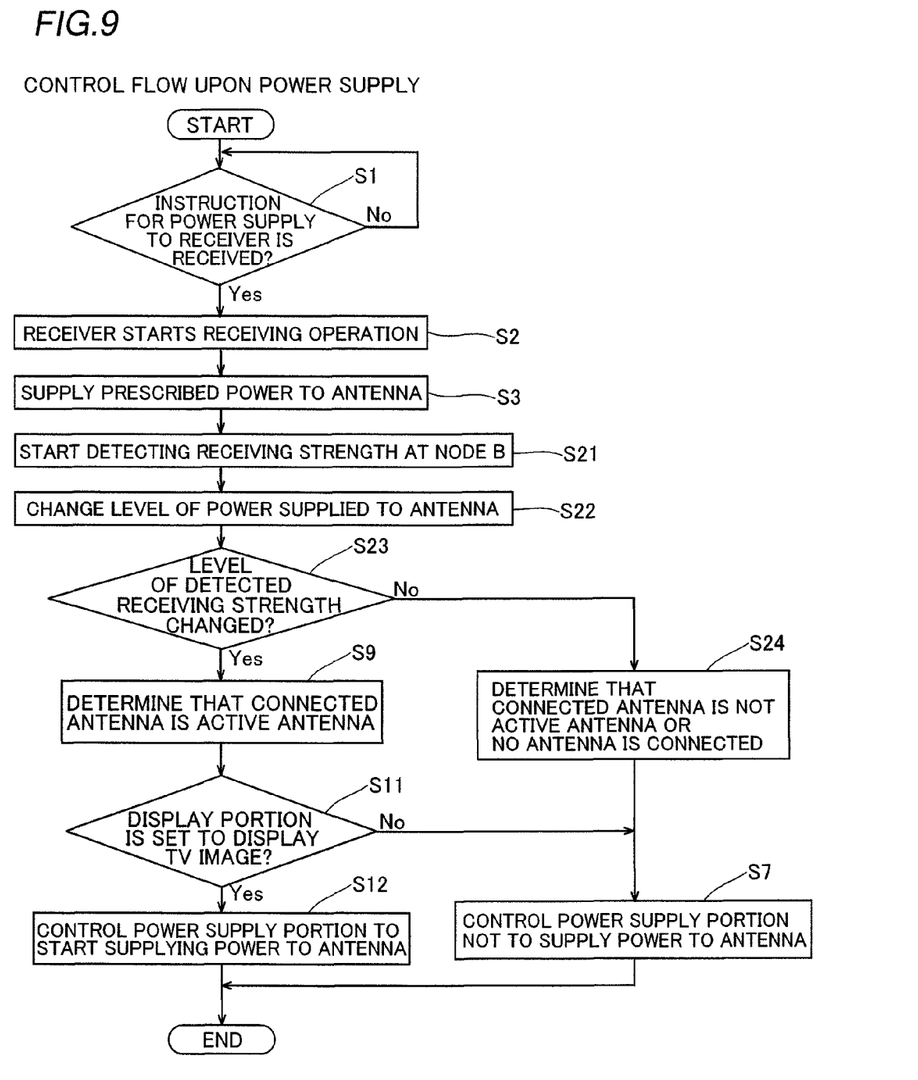
FIG. 9 is a flow chart showing a control flow upon power supply to the receiver according to the second embodiment shown in FIG. 8.

An operation of the receiver 20 according to the second embodiment of the present invention upon power supply is now described with reference to FIGS. 1, 8 and 9.

At steps S1 to S3, the control portion 20*b* operates similarly to the control portion 2*b* according to the first embodiment as described with reference to FIG. 4. When the power supply portion 20*c* supplies power consisting of a voltage of about 5 V and a current of about 30 mA to the antenna 3 (see FIG. 1) through the antenna connection portion 1*a* (see FIG. 8) at the step S3, the antenna 3 supplied with the power starts a receiving operation. When receiving a signal, the antenna 3 transmits the received signal to the receiver 20.

Then, the control portion 20*b* advances to a step S21, and starts detecting the receiving strength of the received signal at the node B (see FIG. 8). Then, the control portion 20*b* changes the level of the power supplied to the antenna 3 at a step S22, and determines whether or not the level of the receiving strength is changed following the change in the level of the power supplied to the antenna 3 at a step S23. When determining that the level of the receiving strength of the received signal is changed, the control portion 20*b* advances to a step S9 for determining that the connected antenna 3 is the active antenna 3*a*, and thereafter performs processing similar to that according to the first embodiment. When determining that the level of the receiving strength of the received signal remains unchanged at the step S23, on the other hand, the control portion 20*b* advances to a step S24, and determines that either the connected antenna 3 is not the active antenna 3*a* or the antenna 3 is not connected. Then, the control portion 20*b* advances to a step S7 for controlling the power supply portion 20*c* not to supply power to the antenna 3, and terminates the processing. In a power supply state of the receiver 20 according to the second embodiment of the present invention, the control portion 20*b* operates similarly to the control portion 2*b* of the receiver 2 according to the first embodiment. Therefore, redundant description is not repeated.

According to the second embodiment, as hereinabove described, the control portion 20*b* is so formed as to detect whether or not the antenna 3 connected to the digital television 1 is the active antenna 3*a* by detecting change in the receiving strength of the signal received from the antenna 3 when changing the level of the power supplied from the power supply portion 20*c* to the antenna 3 for detecting change in the receiving strength of the received signal following change in the level of the power supplied to the antenna 3, thereby easily detecting whether or not the antenna 3 connected to the antenna connection portion 1*a* is the active antenna 3*a*.

According to the second embodiment, the control portion 20*b* determines that the antenna 3 connected to the digital television 1 is the active antenna 3*a* and controls the power supply portion 20*c* to supply power to the antenna 3*a* if determining that the receiving strength of the signal received from the antenna 3 is changed when changing the level of the power supplied from the power supply portion 20*c* to the antenna 3 for determining that the antenna 3 connected to the digital television 1 is the active antenna 3*a* when the receiving strength of the received signal is changed following change in the level of the power supplied to the antenna 3. Thus, the control portion 20*b* can more easily detect whether or not the antenna 3 connected to the antenna connection portion 1*a* is the active antenna 3*a*.

Although the present invention has been described and illustrated in detail, it is clearly understood that the same is by way of illustration and example only and is not to be taken by way of limitation, the spirit and scope of the present invention being limited only by the terms of the appended claims.

For example, while the control portion automatically controls the power supply portion not to supply power to the antenna when detecting that no active antenna is connected to the antenna connection portion in each of the aforementioned first and second embodiments, the present invention is not restricted to this but the user may alternatively select whether or not to supply power to the antenna when the control portion detects that no active antenna is connected to the antenna connection portion.

While the control portion controls the power supply portion not to supply power to the antenna when the display portion displays an image other than the television image in each of the aforementioned first and second embodiments, the present invention is not restricted to this but the user may alternatively select whether or not to supply power to the antenna when the display portion displays an image other than the television image.

What is claimed is:

1. A receiver comprising:

a receiver body including an antenna connection portion connected with an antenna;

a control portion having an antenna detecting function of detecting whether or not said antenna is connected to said receiver body and whether or not said antenna connected to said receiver body is an active antenna including an amplification circuit electrically amplifying and attenuating a received signal; and a power supply portion supplying power to said antenna, wherein said control portion is so formed as to control said power supply portion to supply power to said antenna through said antenna connection portion based on a detection that said antenna connected to said receiver body is said active antenna through said antenna detecting function and to control said power supply portion not to supply power to said antenna connection portion based on at least a detection that said antenna is not connected to said receiver body.

2. The receiver according to claim 1, wherein
said control portion is so formed as to control said power supply portion not to supply power to said antenna connection portion also when detecting that said antenna connected to said receiver body is not said active antenna in addition to the case of detecting that said antenna is not connected to said receiver body through said antenna detecting function.

3. The receiver according to claim 1, wherein
said control portion detects whether or not said antenna is said active antenna through said antenna detecting function every time power is supplied to said receiver body.

4. The receiver according to claim 1, wherein
said receiver body includes a display portion displaying television image information received by said antenna, and
said display portion is enabled to display a set screen portion prompting the user to set whether or not to supply power to said antenna.

5. The receiver according to claim 4, wherein
said control portion controls said power supply portion not to supply power to said antenna when said display portion displays an image other than a television image.

6. The receiver according to claim 1, further comprising a resistance portion provided between said power supply portion and said antenna connection portion, wherein
said control portion is so formed as to detect whether or not said antenna is said active antenna by supplying power of a prescribed level from said power supply portion to said antenna through said antenna connection portion and detecting the level of a voltage between said resistance portion and said antenna connection portion through said antenna detecting function.

7. The receiver according to claim 1, wherein
said control portion has a receiving sensitivity detecting function of detecting change in receiving strength of a signal received from said antenna thereby detecting whether or not said antenna connected to said receiver body is said active antenna when changing the level of power supplied from said power supply portion to said antenna.

8. The receiver according to claim 1, wherein
said receiver body further includes a switching portion on-off controlled by said control portion for controlling power supply from said power supply portion to said antenna.

9. The receiver according to claim 6, wherein
said control portion determines that said antenna connected to said receiver body is said active antenna and controls said power supply portion to supply power to said antenna when determining that said voltage between said resistance portion and said antenna connection portion is a first voltage.

10. The receiver according to claim 6, wherein
said control portion determines that said antenna connected to said receiver body is a passive antenna and controls said power supply portion not to supply power to said antenna when determining that said voltage between said resistance portion and said antenna connection portion is the ground potential.

11. The receiver according to claim 6, wherein
said control portion determines that said antenna is not connected to said receiver body and controls said power supply portion not to supply power to said antenna when determining that said voltage between said resistance portion and said antenna connection portion is a second voltage.

12. The receiver according to claim 3, wherein
said control portion controls said power supply portion to supply prescribed power to said antenna through said antenna connection portion in order to detect whether or not said antenna is said active antenna every time power is supplied to said receiver body.

13. The receiver according to claim 5, wherein
said control portion is so formed as to control said power supply portion to stop supplying power to said antenna connection portion when said display portion is so set as to display said image other than said television image while said power supply portion supplies power to said antenna connection portion.

14. The receiver according to claim 7, wherein
said control portion determines that said antenna connected to said receiver body is said active antenna and controls said power supply portion to supply power to said antenna if determining that said receiving strength of said signal received from said antenna is changed when changing the level of power supplied from said power supply portion to said antenna.

15. A television set comprising:
a receiver including an antenna connection portion connected with an antenna, a control portion having an antenna detecting function of detecting whether or not said antenna is connected to said receiver and whether or not said antenna connected to said receiver is an active antenna including an amplification circuit electrically amplifying and attenuating a received signal and a power supply portion supplying power to said antenna; and
a display portion displaying an image received by said receiver, wherein
said control portion is so formed as to control said power supply portion to supply power to said antenna through said antenna connection portion based on a detection that said antenna connected to said receiver is said active antenna through said antenna detecting function and to control said power supply portion not to supply power to said antenna connection portion based on at least a detection that said antenna is not connected to said receiver.

* * * * *